Dec. 15, 1959     H. T. DINKELKAMP     2,917,073
PRESSURE REDUCING VALVE
Filed Sept. 25, 1953
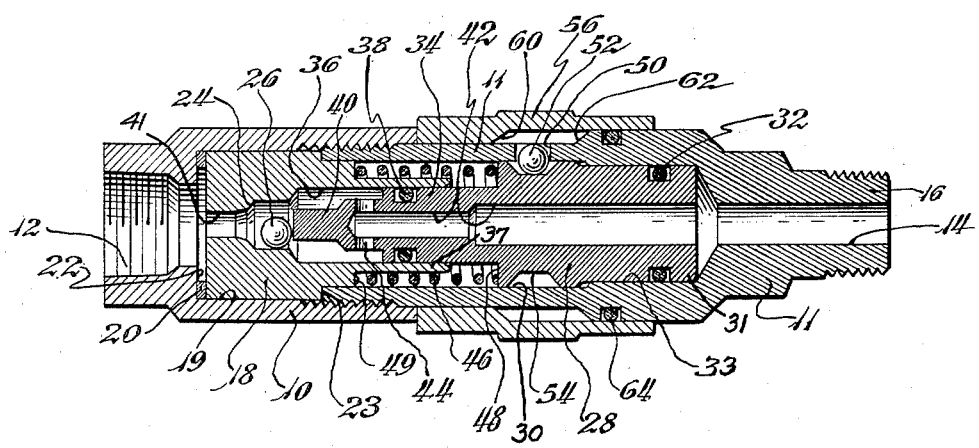
Inventor:
Henry T. Dinkelkamp
By Ahlberg, Hupper & Gradolph
Attorneys.

2,917,073
PRESSURE REDUCING VALVE

Henry T. Dinkelkamp, Niles, Ill., assignor to Stewart-Warner Corporation, Chicago, Ill., a corporation of Virginia Application September 25, 1953, Serial No. 382,242

1 Claim. (Cl. 137—495)

The present invention relates to valves for supplying fluid from a high pressure source, such as lubricant from a high pressure pump, and more particularly to lubricant supply valves which are selectively operable to discharge fluid at an outlet pressure that is either continuously equal to the valve inlet pressure or continuously limited to a value sharply reduced below the inlet pressure.

One object of the invention is to provide an improved valve of the above character having a highly simplified construction which sharply diminishes the size and cost of the valve assembly required to reduce a high input pressure to a very low value while at the same time providing a high fluid flow capacity through the valve and affording most convenient means for controlling the action of the valve to pass fluid either with or without a reduction in its pressure.

Other objects will appear from the following description, reference being had to the accompanying drawing, the single figure of which is a central vertical cross sectional view of the improved regulating valve.

The valve comprises a body in the form of inlet and outlet body sections or sleeves 10 and 11 which are threaded together. The sleeve 10 has an upstream end comprising a threaded inlet bore 12 adapted to be connected to a high pressure lubricant pump, usually of the type which is operated by compressed air. The sleeve 11 has an outlet bore 14 formed in the threaded end portion 16, which is intended to be connected by a hose or the like to a manually operable on and off control valve.

A valve seat and cylinder member or insert 18 is located in the inner end of a counterbore 19 in the sleeve 10 which opens away from the bore 12 through the opposite or downstream end of the sleeve. The insert 18 is clamped against a sealing washer 20 which in turn is pressed against a shoulder 22 formed within the sleeve 10. This is effected by the upstream end of the sleeve 11 which is threaded into the downstream end of the counterbore 19 to abut against an annular shoulder or abutment 23 formed on the seat member 18. This seat member includes an annular valve seating surface 24 for a ball valve 26. When used as a pressure reducing valve the ball 26 is forced toward the seat 24 by a plunger 28 reciprocable in a counterbore 30 extending into the upstream end of the sleeve 11 and communicating with the outlet 14. The downstream end of the plunger 28 forms an outlet piston 31 which fits closely within an outlet cylinder 33 formed in the downstream end of the counterbore 30. An O-ring 32 on the piston 31 forms a slidable seal with the cylinder 33 which is larger in diameter than the valve seat 24.

The leftward end 34 of the plunger 28 is of reduced diameter and is slidable in an inlet cylinder 36 formed in the valve seat member 18 and extending toward the valve seat 24 from the downstream end of the reduced diameter portion or extension 37 of the valve seat member or insert. An O-ring 38 forms a seal for the reduced diameter or inlet piston portion 34 of the plunger.

The leftmost end 40 of the plunger 28 is of still smaller diameter, and is adapted to engage the ball valve 26 to force the latter toward its seat. As shown, a fluid inlet passage 41 extends from the center of the valve seat 24 to the upstream end of the insert 18.

The plunger 28 has a central passageway 42 which extends from the outlet end of the plunger to cross drill ports 44 which communicate with the bore 36 upstream of the inlet piston 34. The plunger 28 is forced toward the right by a coil spring 46 compressed between annular shoulders or spring seats 48 and 49 formed respectively on the plunger 28 and the seat member 18. Thus, the inlet cylinder 36 in the illustrated construction has a diameter just sufficient to provide around the upstream end of the plunger 28 fluid flow capacity commensurate with that through the plunger bores 42, 44.

The sleeve 11 has three equally spaced openings 50 therein for the passage of three steel balls 52 which are adapted to engage in an annular groove 54, the side walls of which are sloping so that the plunger may cam the balls outwardly through the holes 50 into a space within a collar 56 which may be manually slid to the right until its camming shoulder 60 comes into engagement with the sloping stopping shoulder 62 of the sleeve 11. An O-ring 64 acts as a frictional detent to hold the collar in any position to which it may be manually moved.

In lubricating systems of the type in which this pressure reducing valve finds particular utility, the lubricant is pumped by the compressed air operated pump at a relatively high pressure, in the order of six to eight thousand pounds per square inch. In the lubrication of some types of bearings, such, for example, as the bearings of a centrifugal water pump, it is undesirable to employ such high pressures, because these bearings are sealed and the excessive pressure may result in cracking of the pump housing. The valve herein disclosed is therefore interposed between the pump and the manual on-off control valve to effect a substantial reduction in the pressure of the lubricant whenever such bearings are to be lubricated.

The valve operates in the following manner. Assuming the parts to be in the position shown, and compressed air is supplied to the pump, the lubricant, after filling all the passageways through the valve body, and filling the hose leading to the control valve, will rapidly build up in pressure. However, as soon as the pressure acting on the right-hand end of the plunger is sufficient to overcome the force of the spring 46, and the force due to the pressure on that portion of the plunger which lies within the bore 36, the plunger 28 will move to the left and force the ball valve 26 to its seat, shutting off the flow of lubricant. When the manually operated control valve is opened to supply lubricant to the bearing, the pressure at the inlet acting on the effective area of the valve seat 24 will force the plunger 28 again to the right, permitting flow of lubricant past the valve 26, until the pressure at the outlet 14 again builds up to that required to force the plunger 28 to the left.

The diameters of the cylinders 33 and 36 and the strength of the spring 46 when the latter is compressed are such that the valve 26 will be closed whenever the pressure at the outlet exceeds a certain percentage of the pressure at the inlet, plus the pressure required to overcome the force of the spring 46 (disregarding the effect of friction). In a regulating valve constructed as above described and as shown, the ball valve was forced to its seat whenever the pressure at the outlet exceeded approximately one-eleventh of the pressure at the inlet. Thus, assuming that the discharge pressure of the pump varies from 6,600 to 8,800 p.s.i., as a result of variations in the pressure of the compressed air used to operate the pump, the pressure at the outlet of the regulating valve would vary between 600 and 800 p.s.i.

Whenever the pressure reduction function is not to be employed, the collar 56 is moved to the right to bring its shoulder 60 against the shoulder 62 of the sleeve 11, thereby camming and holding balls 52 inwardly into the annular groove 54 of the plunger 28. If the plunger is in its leftward position holding the valve 26 closed, the pump may be stopped and the manual or off control valve opened momentarily to drop the pressure at the reducing valve so that the spring 46 may move the plunger 28 to the right or downstream to bring the annular detent groove 54 in alignment with the locking or detent balls 50 so that the latter may be forced into the groove by the camming action of the collar 56.

This pressure reducing valve thus forms a very simple and convenient means for reducing the pressure of the lubricant supplied to bearings whenever this is desirable, and which may be readily rendered ineffective whenever the lubricant is to be supplied to the bearings at high pressure.

The ball valve 26 constitutes an inexpensive valve which is self-centering on its seat, but it will be apparent that the reduced diameter end portion 40 could be formed so as to function as the valve for the seat 24. The plunger 28 in effect constitutes two connected pistons, one operating in the bore 36 and the other operating in the bore 30.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

An elongated fluid pressure control valve for passing fluid therethrough at an outlet pressure which is either continuously equal to the valve inlet pressure or limited to a predetermined small fraction of the valve inlet pressure plus a predetermined pressure increment, said valve comprising, in combination, a unitary inlet body section having upstream and downstream ends and defining in the upstream end a fluid inlet bore extending longitudinally into the body section, said inlet body section defining a counterbore extending from said downstream end thereof to said inlet bore, an elongated unitary insert having a cylindrical upstream end fitting closely within the upstream end of said counterbore, said insert having a downstream end sharply reduced in diameter with respect to the upstream end thereof to define on the medial portion of the insert an external annular abutment and an external annular spring seat smaller in diameter than the abutment and to form a cylindrical downstream extension of the insert limited in diameter to the inner diameter of the spring seat, said insert defining a hollow inlet cylinder extending into the insert along the axis thereof from the downstream end of said extension thereon, said insert being shaped adjacent the upstream end of said cylinder to define an annular valve seat and to form an inlet passage extending from the center of the valve seat to the upstream end of the insert, said valve seat having a diameter limited by the diameter of said inlet cylinder, a unitary longitudinal outlet body member having a downstream end defining an outlet bore therein and having an internal counterbore extending from the outlet bore to the opposite upstream end of the outlet body member, the counterbored upstream end of the outlet body member being telescoped over the downstream end of said insert in radially spaced relation to said extension thereof and threaded into the downstream end of said inlet body member in axially abutting engagement with said insert abutment, the downstream end of said outlet body member counterbore defining an outlet cylinder having a diameter sharply greater than the diameter of said inlet cylinder but limited by the diameter of the upstream end of said last mentioned counterbore, a unitary plunger having a downstream end defining an outlet piston fitting slidably within said outlet cylinder, said plunger having an upstream end portion sharply reduced in diameter to form an inlet piston fitting slidably within said inlet cylinder and to define an annular spring seat on the medial portion of the plunger, a helical compression spring larger in diameter than said insert extension and extending between said spring seats on said insert and said plunger respectively, a valve member movably disposed in adjacent opposing relation to said valve seat, means on the upstream end of said inlet piston for separably engaging said valve member with said valve seat as an incident to movement of said plunger toward the valve seat, said plunger defining an axial passageway therein opening into said inlet cylinder upstream of said inlet piston and opening into said outlet cylinder downstream of said outlet piston, and coacting detent means on said downstream body member and on said plunger for releasably holding the latter in a downstream open valve position after movement of the plunger to the downstream position by said spring.

References Cited in the file of this patent

UNITED STATES PATENTS

| | | |
|---|---|---|
| 762,274 | Bourseau | June 14, 1904 |
| 892,450 | Robinson | July 7, 1908 |
| 1,876,355 | Smith | Sept. 6, 1932 |
| 2,463,253 | Earle | Mar. 1, 1949 |
| 2,726,790 | Woelfer | Dec. 13, 1955 |
| 2,731,034 | Dinkelkamp | Jan. 17, 1956 |